Oct. 17, 1933.  F. KRUEGER  1,930,562
METHOD AND APPARATUS FOR FORMING SMOOTHLY ROUNDED CAN BODIES
Filed Aug. 11, 1932   2 Sheets-Sheet 1

INVENTOR
Frank Krueger,
BY
Fraser Myers Manley
ATTORNEYS.

Oct. 17, 1933.    F. KRUEGER    1,930,562
METHOD AND APPARATUS FOR FORMING SMOOTHLY ROUNDED CAN BODIES
Filed Aug. 11, 1932    2 Sheets-Sheet 2

Patented Oct. 17, 1933

1,930,562

UNITED STATES PATENT OFFICE 1,930,562

METHOD AND APPARATUS FOR FORMING SMOOTHLY ROUNDED CAN BODIES

Frank Krueger, Brooklyn, N. Y., assignor to E. W. Bliss Company, Brooklyn, N. Y., a corporation of Delaware Application August 11, 1932. Serial No. 628,339

31 Claims. (Cl. 153—54)

This invention relates to the art of making sheet metal receptacles, such as tin cans and aims to provide a method and apparatus by which tubular can bodies are initially formed and then smoothed and shaped into a true-round cylinder.

In the commercial manufacture of can bodies considerable difficulty has hitherto been experienced due to the tendency of the metal sheet or blank to bend irregularly when wrapped around the body-forming mandrel or horn. The tubular body thus produced, instead of presenting the desired smoothly rounded contour, exhibits a multiplicity of local irregularities in the form of flattened areas. In some instances the effect is so pronounced as to give the entire tube the appearance of a many-sided polygonal body, the many small, flattened faces extending from end to end of the tube and roughly parallel to the axis thereof. Such local irregularities or "flats" as they are sometimes termed, greatly mar the appearance of the can body and not infrequently interfere with the subsequent flanging and seaming operations by which the ends of the can are attached to the body. In addition, it has been found difficult to form and seam a can body by the usual methods so as to obtain a finished tube which, disregarding the aforesaid local irregularities, is of a generally true-round, cylindrical form. That is to say, instead of being round, the body may be of roughly elliptical form or it may have a more pronounced curvature near the seam than at other points of the body.

Such distortion is due not only to the initial difficulty of uniformly bending and forming the blank into the required tubular shape, but also to the distorting effects resulting from the various steps in forming the side seam. This ordinarily involves the operation of bending the side edges of the blank to form hooks, the subsequent interlocking and "bumping" of the hooked edges to form the seam, and the further operations incident to soldering the seam when cans of the soldered type are required. In some cans the edges are simply overlapped and soldered to provide what is known as a "lap seam". Regardless of the type of seam, the various distortions hereinbefore described enter in during the forming of the body and also due to the soldering operation. Any local irregularities, "flats" or sudden breaks in the curvature of the body will remain in the finished can. The distortion involving the general shape or form of the body which is referred to when the body is said to be "out of round" is considerably minimized by the subsequent end-flanging and seaming operations to which the body is ordinarily subjected, but in the meantime the difficulty of handling the "out of round" body in automatic machinery and conveyors is materially increased. And even when the ends have been finally secured thereto the body will frequently exhibit a lack of roundness, particularly near the side seam.

If the finished cans are to be used for "high vacuum" packing, an important physical advantage results from the use of bodies which are truly round and free from local irregularities or "flats" because bodies so formed are far more highly resistant to collapse. Such smooth and true-round bodies may therefore be made of lighter gauge metal and have the same resistance to external pressure as that of an irregularly formed body of heavier gauge.

Various methods have been resorted to in an endeavor to obtain smooth and more perfectly rounded bodies. One method frequently employed is to subject the body blank to a preliminary curving operation before its side edges are brought together to form the seamed tube. In some instances the sheet from which the blanks are cut is first subjected to the action of so-called "leveling" rolls by which the bending quality of the metal is somewhat improved so that the blanks may be bent with a more uniform curvature when wrapped around the body-forming horn. These methods, while of some advantage, fall short of producing the desired result; first, because they do not entirely eradicate the tendency of the metal to bend irregularly; and second, because the body is subject to various deformations in the process of hooking and seaming its side edges, as hereinbefore set forth.

An important feature of the present invention resides in the fact that the can body is made smooth and round after the blank has been formed into a seamed tube and therefore the various distortions and local irregularities resulting from the processes of forming and seaming the tube are effectively eliminated. The invention is generally applicable to all methods of can body making and is therefore of marked advantage to manufacturers who are already equipped with body-making machinery in that it permits of converting the output of existing machines into finished can bodies which will meet the most exacting requirements as to smoothness of contour and regularity of form.

Another advantageous use of the invention arises from the practice of producing can bodies in one plant and shippnig them to another where the unfinished bodies are then flanged and receive the ends. In the course of shipment the open-ended can bodies are often accidentally deformed, and indeed it is not an uncommon practice to deliberately distort the bodies and pack them out of round in order to get a greater number in a given size container. Such deformed bodies may again be made smooth and round by the method according to the present invention, and when made up into finished cans show no trace of their previous deformation.

The invention therefore provides for the elimination of distortions commonly found in can bodies regardless of their cause, and is directed not only to the manufacture of smoothly rounded can bodies, but also to the smoothing and truing of can bodies which have been abnormally deformed. It provides a method by which the wall of a tubular can body may be subjected to what may be termed "wave-rolling" or "wave-bending" for the purpose of eliminating irregularities in the contour thereof.

Another object of the invention is to provide a resiliently deformable roll, which, in various combinations, is adapted for wave-rolling and for smoothing out irregularities in sheet metal and for rounding the sheets to a uniform curvature.

The invention further provides a system of rolls which may be regulated so as to specially adapt them to the duty of eliminating local irregularities in the wall of a tubular body, the same rolls in a different relative adjustment being adapted to shape said wall to the desired cylindrical form.

Another object of the invention is to provide means for guiding a tubular body while it is subject to the action of the rolls, whereby to insure its proper alignment therewith.

Further features and advantages of the invention will be apparent from the following description, in which reference is had to the accompanying figures, and wherein,—

Figures 1, 2, 3, 4, 5:
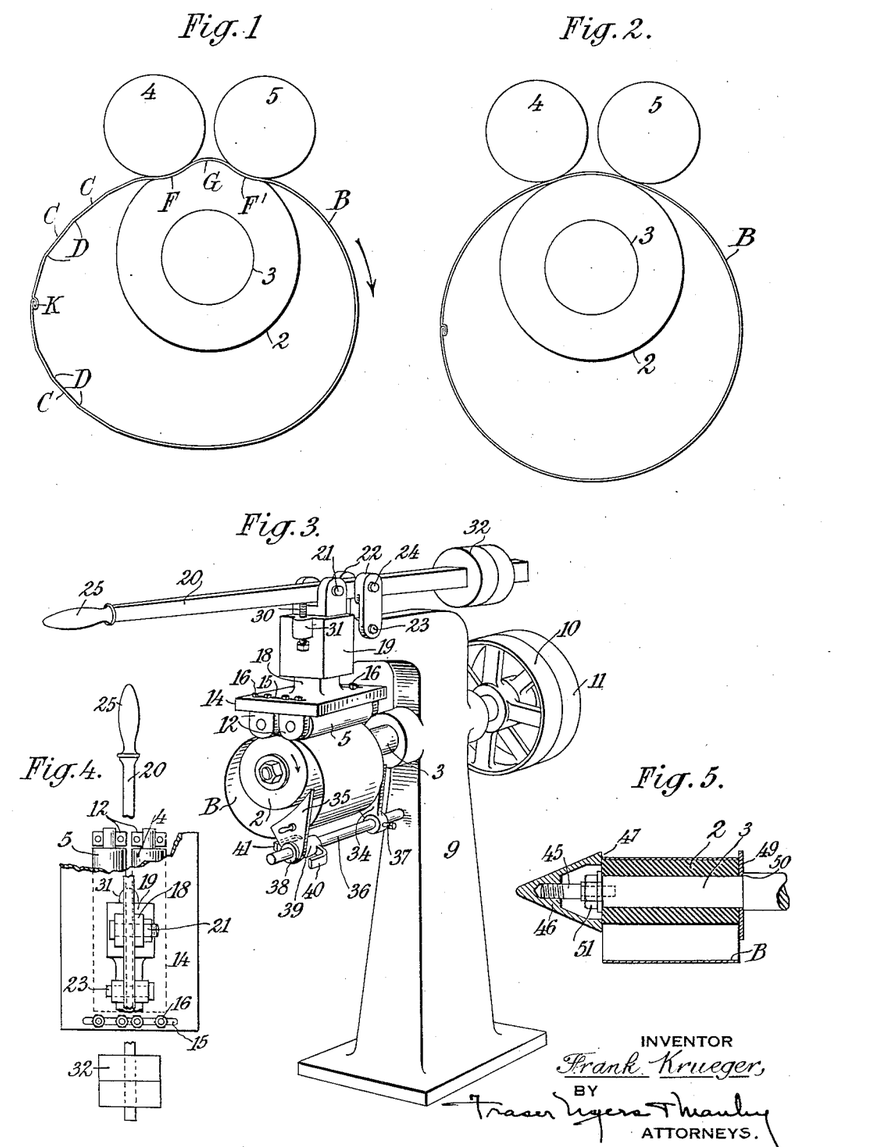
Figure 1 is an end view illustrating the wave-rolling effect of rolls arranged in accordance with the preferred embodiment of the invention, the internal roll being resiliently deformable.
Fig. 2 shows the effect of the same rolls when adjusted to true or round a tubular body after the local irregularities have been removed by the wave-rolling operation indicated in Fig. 1.
Fig. 3 is a perspective view of a machine adapted to perform the operations indicated in Figs. 1 and 2.
Fig. 4 is a plan view of the working head of the machine shown in Fig. 3, portions being broken away to better show the mechanism beneath.
Fig. 5 is an axial cross-section taken through a resilient roll, the figure showing a conical end that may be applied to the internal roll of Fig. 3 to facilitate the insertion of a badly deformed body between the rolls, the figure also showing a modified form of end guide that may be substituted for those shown in Fig. 3.

The preferred method according to the present invention, of eliminating local irregularities such as "flats" or breaks in a tubular can body, is indicated in Fig. 1. The can body is shown at B, such body being out of round and having a broken or locally flattened surface. The characteristic "flats" resulting from the irregular bending of the body blank when the latter is bent around a mandrel or horn to initially form the body tube are seen at C. Between each of these flats are breaks in the body contour, as indicated at D, these being of materially sharper curvature than that which should be present to provide the desired smooth cylindrical contour. Such irregularities are effectively eliminated by the cooperative action of the internal and external rolls when arranged as shown in Fig. 1. In this instance a single internal roll 2 is provided, this roll, which is of a resiliently deformable character, consisting preferably of a heavy rubber cylinder mounted upon a rotatable shaft 3. The rubber cylinder may be secured to the shaft in any suitable manner, as, for example, by vulcanizing or cementing. If the shaft is slightly larger than the normal diameter of the central bore within the rubber cylinder, the latter will have sufficient friction, when forced onto the shaft, to maintain a relatively fixed position thereon without necessitating any other attachment. The external rolls 4, 5, are preferably made of metal.

The can body B is inserted between the external and internal rolls, and such rolls are then brought together under pressure so that the internal roll is actually indented and deformed, as shown. It will be seen that the tubular can body as thus engaged is bent in a series of waves. The pressure of rolls 4, 5, produces arcuate bends F, F', in the body wall, which are the reverse of the normal curvature of the tubular body and also the reverse of the exaggerated curvatures appearing at the aforesaid breaks D therein. That is to say, the normally convex surface of the body 2 is locally deformed by the action of the rolls so that it becomes a concave surface. Because of the fact that very considerable pressure is required to deform or indent the internal rubber roll 2, the thin metal wall of the body will be forced into accurate conformity with the contour of the non-yielding external rolls 4, 5. The tinplate ordinarily employed in the manufacture of can bodies is of such character as to receive a permanent "set" when bent in this manner. In other words, the material is stressed beyond its elastic limit, and since this action progresses circumferentially around the body when the latter revolves between the rolls, every point in the surface of the body will be momentarily stressed beyond its elastic limit.

The preferred roll arrangement is such that the elastic limit of the material is exceeded by circumferentially progressive waves or bends, stressing it first in one direction, and then in the other. That is to say, the body is progressively acted upon by the rolls so that each element of its surface is bent both concavely and convexly, these bends or waves both outwardly and inwardly exceeding the elastic limit of the material. It is the external concaving of the normally convex surface of the body which is of greatest value in reducing the local irregularities or breaks in the surface thereof, and this effect is ideally achieved by the roll arrangement of Fig. 1 wherein the resilient inner roll causes every point on the body surface engaged thereby to accurately conform to the contour of the small external rolls. The pressure required to deform the flexible inner roll is such that the sharp breaks D are not only flattened out, but the metal at the point of the break, and indeed throughout the entire body, is progressively stressed beyond its elastic limit and with absolute uniformity laid against the cylindrical surface of the external rolls 4 and 5.

There being two external rolls, there results not only the character of deformation above described wherein the normally convex surface of the body is locally rendered concave at the points F, F', but an opposite waiving or bending effect at the point G. It is obvious that even though the internal roll were not of a yielding character, the pressure of the outer rolls bringing the body blank into conformity with the normal cylindrical contour of the inner roll would produce a bend at the point G which would be considerably sharper than the normal curvature of the can body because of the fact that the internal roll is of smaller diameter than that of the body. But in addition to this, a sharper wave or bend is produced at the point G due to the tendency of the material of the yielding roll to flow radially outward between the external confining rolls 4, 5. This effect is clearly seen in Fig. 1. The bulging of the internal roll between the confining external rolls thus produces a curvature at the point G which is approximately equal to the reversed curvatures at the points F, F'. Thus it will be seen that as the body rotates in the direction of the arrow in Fig. 1, any point on its surface will successively receive relatively sharp alternate flexures, so that it is waved both concavely and convexly.

In practice the action of the aforesaid rolls has been found to eliminate all trace of local irregularities in the surface of the can body, the treatment being so effective that a body which has been deliberately wrinkled and crushed entirely out of shape may be made entirely smooth again in the sense that there will be no sharp breaks in the contour thereof. The body will yet not be true-round, and if the pressure of the external rolls is suddenly released there will be a residual wave effect at the points where the rolls last engaged the body.

The aforesaid residual wave effect and any general lack of roundness of the body, such as is represented by the roughly elliptical form indicated in Fig. 1, are effectively removed by the same rolls hereinbefore described by simply changing the working relationship of said rolls. The required relationship for finally truing up the body is shown in Fig. 2. In this condition the external rolls 4, 5 are set at a greater radial distance from the internal roll 2 so that instead of penetrating the internal roll they simply bring the can body into conformity with a section of its normally cylindrical surface. The body is then rotated between the rolls until all parts of the body wall have been brought to a uniform curvature. It is not important that the bending effect of the rolls set the metal to the finally desired cylindrical curvature of the body. All that is necessary is to effect a uniform set throughout the entire surface. This is perhaps best explained by stating that when a body of somewhat larger diameter than that shown in Fig. 2 has been subjected to the truing action of the rolls, and such body is cut open longitudinally as a matter of experiment, said body will spring into a cylinder of smaller diameter instead of retaining its normal cylindrical curvature. Such experiment shows that the metal has been set to a sharper curvature than that which it is constrained to occupy when forming a part of the continuous tubular wall; but since this set is uniform throughout the circumference the body will always maintain a true-round cylindrical form. In the example given it will be seen that throughout the body wall there is a residual elastic stress tending to cause each part to spring into a somewhat more sharply curved form, but since this stress is substantially uniform at all points the finished tube assumes the required true-round cylindrical contour. This is mentioned merely to indicate that an adjustment of the rolls which is such as to leave a uniform residual elastic stress throughout the cylinder wall does not adversely affect the roundness of the finished body. By suitable adjustment of the rolls for any given weight and character of material the body wall may, if desired, be set to the exact curvature of the finished cylindrical form.

It will be understood that the truing operation above described in connection with Fig. 2 is not necessarily resorted to except when it is desired to obtain tubular bodies that are quite accurately rounded. The major defects commonly found in can bodies are practically eliminated by the process described in connection with Fig. 1. The local irregularities comprising the flats and breaks in the body contour are effectively eliminated by such process and the body may then be operated upon by the conventional end-flanging and end-seaming machines. There is, however, a distinct advantage in further truing up the bodies by the method of Fig. 2, where such bodies are to be transferred from one machine to another on automatic conveyors inasmuch as there is far less likelihood of stoppages and misfeeds when the bodies are of truly circular form.

Referring again to Figs. 1 and 2, it will be noted that the transition from the first to the second relationship of the rolls may be made very gradually, so that the first process merges smoothly into the second. If while the tubular body wall is rotating between the rolls the internal and external rolls be gradually separated, the waves or bends F, G, F', will be reduced in intensity, and when the rolls have reached the position indicated in Fig. 2, there will be no trace of such bends. Indeed the only way that it is possible to find any marked indication of the reversed curves F, G, F', is to first stop the rolls while maintaining the relationship indicated in Fig. 1. If then the rolls be separated their impression will be found in the body wall, their bending effect being localized at one point due to the absence of the relative rotation of the body which would ordinarily distribute the bending effect over a wide area. In practice the body would be inserted between the rolls and the latter brought together, the rolls and body continuing to revolve until the surface of the body is smoothly rounded, the relative rotation thereafter continuing until the rolls are again separated. In this manner the local bending effect of the rolls is distributed over the circumference of the body and leaves no readily discernible impression therein.

A machine for suitably practicing the method hereinbefore described is shown in Figs. 3 and 4. The internal, resiliently-deformable roll 2 is mounted upon a shaft 3. This shaft is journaled in a frame or standard 9 and is driven in any suitable manner. In the embodiment illustrated, tight and loose pulleys 10, 11 are provided on the shaft in a manner well understood whereby to permit the starting and stopping of the machine as by any usual belt-shifting arrangement. The external rolls 4, 5 are journaled at each end in bearing blocks 12 which are adjustably secured on the lower face of a platen 14. Said platen is provided with a transverse slot 15 at each end through which screws 16 extend into the blocks 12. In this manner the blocks may be shifted transversely to the axis of the rolls and the separation of the rolls thus regulated. Ordinarily the rolls 4, 5 are found to give the best result when brought quite close together, as shown in Figs. 1 and 2. It will be apparent that by increasing the distance between the rolls 4, 5, the contour of the resilient roll 2 where it is engaged between them and thereby subjected to pressure, will be altered. It will be apparent that the closer the rolls 4, 5 are brought together the sharper will be the bulging deformation in the zone G of the resilient roll for any given application of pressure. This capacity for varying the horizontal spacing of the rolls 4, 5, thus permits of varying the intensity of the convex body-bending action at the point G relative to the concave bending at the points F, F'. With the tin-plate ordinarily employed in the manufacture of can bodies, the adjustment indicated in Fig. 1 is found to be most satisfactory. If heavier stock or material having a different elastic limit is employed, a somewhat different adjustment of the rolls may be found to be more effective.

As above indicated, the bearing blocks which carry the free rolls 4, 5 are made fast in the desired adjustment on platen 14 by tightening the screws 16. The vertical position and pressure applied to said rolls is manually controlled by the operator. The platen is centrally supported by an upright post 18 formed integrally therewith. This post, which is of square cross-section, slides freely within a vertical guideway 19 formed at the upper end of frame 9. The upper end of said post is forked to receive the actuating lever 20, which is pivoted at 21 within the said forked end.

The lever is fulcrumed at the upper end of links 22, the said links being carried upon a pivot pin 23 secured in frame 9, as shown. The pin 24 at the upper end of the link fulcrum is preferably disposed close to the pin 21 so as to afford adequate leverage whereby the operator may exert the required pressure upon the roll-carrying platen by pressing down upon the hand grip 25 of lever 20 without exerting great force. Any other suitable linkage arrangement may be employed wherein sufficient leverage is afforded to permit the operator to exert the required pressure upon the rolls. With rolls of the relative size and character described and operating upon the usual tin-plate employed in can bodies, a pressure of approximately 300 pounds is applied to the platen in order to achieve the most efficient and rapid elimination of the local irregularities in the body wall during the wave-bending operation typified by the adjustment of the rolls, as shown in Fig. 1. The required pressure will, of course, vary with the diameter of the rolls and the degree of resilience of the deformable roll 2.

In order to insure a uniform treatment of successive can bodies, an adjustable abutment is provided to limit the downward movement of the roll-carrying platen. This abutment is conveniently provided by a screw 30 which is threaded through a lug 31 formed integrally with the guide head 19 of frame 9. The upper end of said screw is positioned to check the descent of lever 20 when the downward movement of the latter has effected the required engagement of the rolls and consequent penetration of the resilient roll 2 by the metal rolls 4, 5. The adjustment of screw 30 may properly be said to constitute a means for regulating the pressure between the internal and external rolls inasmuch as such pressure is proportional to the penetration of the resilient internal roll; and the operator will therefore have no difficulty in applying equal working pressures when operating upon successive can bodies since he is required only to depress lever 20 until it engages the abutment screw 30. In order to facilitate the manipulation of the rolls, a counterweight 32 may be provided on the rearward extension of lever 20, this weight being sufficient to slightly overbalance the weight of the parts on the opposite side of fulcrum 24, so that when the operator releases the lever the rolls 4, 5, are lifted clear of the lower roll 2 whereby to permit the free removal of the finished can body and insertion of another therebetween.

After the local irregularities have been worked out of a body by one or more revolutions thereof between the rolls under the conditions indicated in Fig. 1, the operator gradually diminishes the pressure upon lever 20, and if it is not required that the body be brought accurately to true-round cylindrical form, the body may be immediately removed from the machine. If, however, it is desired to accurately true the body, the operator holds the rolls in the relative adjustment indicated in Fig. 2 until the body has made one or more complete revolutions. In this adjustment the effect of the rolls is to bring all parts of the body circumference to a uniform curvature or set, so that the body when removed, will have a true circular cylindrical form, or will at least so closely approximate such form, that as a practical matter the can body may be said to be true-round. It will roll smoothly along conveyors and can be handled in automatic flanging and seaming machines with considerably greater certainty and accuracy than the usual unprocessed tube. As hereinbefore set forth, the truing operation does not require any critical adjustment of the rolls. The operator merely maintains a slight pressure upon the lever so as to bend the wall of the can body around the surface of the internal roll 2, but without any deformation of said roll. No skill is required to hold the rolls in this relationship, since the operator can tell very definitely when the external rolls cease to indent the internal deformable roll by the sudden cessation of force required to hold down the lever. Very slight force is required to merely bend the body to the cylindrical contour of the inner roll, as indicated in Fig. 2, whereas very considerable pressure is required to achieve the operating condition indicated in Fig. 1 where the internal roll is deformed.

In order to insure that the can body rotates about an axis substantially parallel to the axes of the rolls, end guides 34, 35 are provided. These may be conveniently carried upon a horizontal bar 36 which is rigidly mounted upon frame 9. The guides may be of generally triangular shape, as shown in Fig. 3, the rear guide 34 being secured in the appropriate position upon rod 36 by set screw 37. This guide remains fixed and bears against the rear edge of the can body, preventing any rearward axial displacement thereof. The guide 35, which engages the forward end of the can body, may be rocked about rod 36 so that it can be swung out of the way to permit the free insertion of a body between the rolls. Guide 35 is retained in the desired axial adjustment by means of collars 38, 39. The collar 39 carries abutments 40, 41, which serve to retain guide plate 35 in the required angular position. After the can body B has been slipped over the internal roll 2, the guide plate is swung into the position shown in Fig. 3 and there held by its engagement with abutment 41. After the work has been completed, the guide 35 is swung outwardly into contact with abutment 40 to permit the removal of the body.

In Fig. 5 there is shown a modified guide arrangement and also a conical body-expander, which may be provided at the end of the resilient roll 2 of Fig. 2. The function of the expander is to facilitate the entering of a badly deformed can body between the rolls. The resilient roll 2 is mounted upon the driving shaft 3, as hereinbefore set forth. In the present instance an extension piece 45 is screwed into the end of shaft 3, the end of this piece being threaded to receive the conical expander 46. It will be noted that the diameter of the cone is somewhat greater than that of the roll 2, the base of the cone thus providing a shoulder 47 which serves as an end guide for the can body. A similar guiding surface is afforded at the opposite end of the roll by disk 49. A shoulder 50 on shaft 3 provides an abutment for the said disk, and the disk and roller are held thereagainst by the nut 51 which is threaded onto the free end of the shaft so as to bear against the end of the roll. It will be understood that the end guides 47, 49 in this instance revolve with the roll, whereas the guides 34, 35 in Fig. 3 are stationary, but either arrangement serves equally well to retain the can body B in proper alignment relative to said roll. The conical end 46 is so tapered that it may be inserted within a can body which has been badly deformed, and when forced therethrough will expand the body to such diameter that the latter may be freely slipped over the roll 2. This, of course, does not of itself produce any substantial rounding of the body but is provided merely as a convenient means of inserting a deformed body between the rolls. Thereafter the external rolls are brought into operative engagement, as hereinbefore described, and the body smoothly rounded as hereinbefore set forth.

Figures 7, 9:
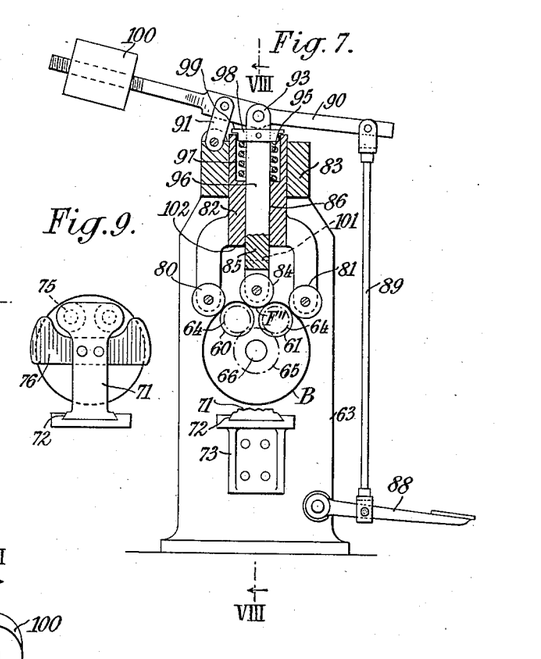
Fig. 7 is a vertical cross-section of a second embodiment of the invention wherein a plurality of rigid or nondeformable rolls perform the functions of the roll arrangement shown in Figs. 1 to 3, inclusive.
Fig. 9 is an end view of the bearing bracket and body guide which are broken away in Fig. 7 in order to show the parts of the rear thereof.
Figure 8:
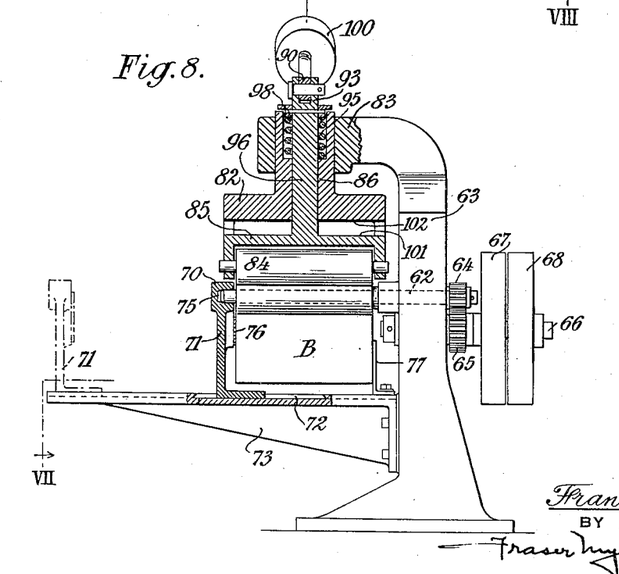
Fig. 8 is a vertical cross-section taken along the line VIII—VIII of Fig. 7.

In Figs. 7, 8 and 9 there is shown an embodiment of the present invention wherein the body-processing rolls are all of a rigid or non-deformable character. In order to achieve the same results that are obtained by the use of three rolls where one is of the resiliently-deformable character hereinbefore described, it is necessary to provide five rolls in the present instance. It will thus be seen that a very distinct advantage results from the aforesaid resilient roll combination and such arrangement is an important part of my invention. My general method of wave-bending a can body may, however, be practiced by the use of non-deformable rolls, as will now be described. Referring to Fig. 7, it will be seen that two internal rolls 60, 61 are provided, the can body B being exteriorly engaged by three similar rolls, as shown. The internal rolls are rigidly mounted upon parallel shafts 62 which are journaled in the upright frame 63. These shafts extend through the frame, and at their right hand ends carry pinions 64 which mesh with driving gear 65. Gear 65 is secured upon power shaft 66, which is journaled in frame 63 and receives power in any suitable manner, as, for example, by the tight and loose pulley drive 67, 68.

For rolling ordinary tin-plate the above described roll mounting is sufficiently rigid, but if sheets of heavier stock are to be rolled, it is desirable to provide additional bearings for roll shafts 62. The bearings 70 provided at the left end of the said shafts, as shown in Fig. 8, are formed in the upper end of a bracket 71 which slides in a horizontal guideway 72 formed in a rigid supporting arm 73 which is secured to the frame 63. It is necessary that these bearings be mounted in some such manner in order to permit the tubular can body to be slipped over the internal rolls, the bearing bracket 71 occupying the dotted line position until the can body B is put in place. Thereafter the bracket is moved along guideways 72 until the bearing recesses 75 engage the free ends of roll shafts 62. The bracket in this case also carries the end guide plate 76, which serves to retain the can body in proper position when the bracket is shifted to the position indicated in solid lines. At the opposite end of the can body a guide plate 77 is provided, the latter being conveniently mounted upon the frame arm 73. The can body is thus confined and effectively guided between the plates 76 and 77 while being free to revolve under the action of the rolls.

The external rolls 80, 81 are mounted in a vertically-reciprocating slide or carrier 82 which is freely guided within the stationary head 83 of frame 63. The central external roll 84 is mounted upon a separate slide or carrier 85 which slides within the vertical guideway 86 formed centrally in the carrier 82. The vertical movement of carrier 85 is controlled by a treadle lever 88 through any suitable linkage, which may comprise a vertical connecting rod 89 and an overhead lever 90, said lever being supported upon fulcrum link 91 and connected to the forked end 93 of the internal slide. The linkage is such that when the treadle 88 is depressed, the slide or carrier 85 will be lowered so as to bring the central roll 84 into engagement with the can body B, as shown in Fig. 7, and will thus bend the body inwardly in the gap between the rolls 60, 61, so as to render the normally convex body concave between the said rolls. At the same time rolls 80 and 81 will also be brought into working engagement with the body so as to bend the latter around the upper surfaces of internal rolls 60, 61, in order to produce an opposite bending effect upon the body wall. Since the diameter of each of the rolls is very much smaller than that of the tubular body, it will be seen that the body wall will be bent alternately outwardly and inwardly, the sharpness of these waves or bends being such as to exceed the elastic limit of the material. The rotation of power-driven rolls 60, 61 will cause the tubular body to revolve between the internal and external rolls, so that the aforesaid wave-bending action is circumferentially progressive. Such action, as hereinbefore described, has the effect of eliminating the local irregularities in the contour of the tubular body.

It will be noted that the downward motion of the central roll carrier or slide 85 is transmitted to the carrier 82 for the side rolls 80, 81, through a spring 95. This spring surrounds the upright central column 96 of slide 85 and is seated within a bore 97 formed in slide 82. The upper end of the spring bears against a collar 98 which is secured to column 96. When said column is moved downwardly by the depression of treadle 88, spring 95 will be compressed and will force the slide 82 downwardly so as to bring the rolls 80, 81 carried thereby into the body-bending position indicated in Fig. 7. Even in the absence of such spring connection the slide 82 will descend under its own weight to approximately the position shown, and if desired, may be made sufficiently heavy so that the rolls will be carried to the full wave-bending position solely by the weight of the slide. In order to insure that the slide 82 descends to the position where the rolls 80, 81 perform the maximum bending, the collar 98 secured to the central column of slide 85 is provided with a flange 99 which engages the upper end of slide 82 when the column is in its fully depressed position. Ordinarily the slide 82 will descend under the action of the spring and of its own weight, in advance of the inner slide 85, the can body being first gripped between rolls 60, 80 and 61, 81, and thereafter engaged by the central roll 84 which imparts the reversed bend in the can body in the zone F″ between rolls 60, 61.

After one or more revolutions of the can body the wave-bending action of the cooperating rolls will have smoothed out the local irregularities in said body. If then it is desired to true the body to a more nearly perfect circular contour, an action analogous to that obtained by the rolling method of Fig. 2 is had in the present instance by permitting the central roll 84 to rise to a point where it no longer produces a reverse bending effect upon the can body. To attain this relative adjustment of the rolls, the operator permits the treadle lever 88 to rise a short distance under the action of the counterbalance 100, which acts through lever 90 upon the roll carrier or slide 85. The spring 95 also contributes a force tending to elevate said slide while simultaneously holding slide 82 in operative position. In this condition the rolls 80, 81 set the body wall to a uniform outwardly convex curvature as the body continues to revolve. After this truing operation has been completed the operator releases treadle lever 88 and the inner slide moves upwardly under the action of the counterweight 100 until the head 101 of said slide engages the lower surface 102 of slide 82, the two slides thereafter moving together so that their three rolls are elevated sufficiently to permit the removal of the can body.

The operation of the embodiments hereinbefore described has been fully set forth in connection with such description. In both the constructions of Figs. 1 to 5, inclusive, and Figs. 7 to 9, inclusive, the can body is subjected to the action of internal and external wave-bending rolls, such wave-bending progressing circumferentially as the body revolves. Obviously a wide variety of roll combinations may be provided to achieve substantially the same end, and such rolls or any desired number of them, may be driven in any suitable manner to achieve the required rotation of the can body.

Figure 6:
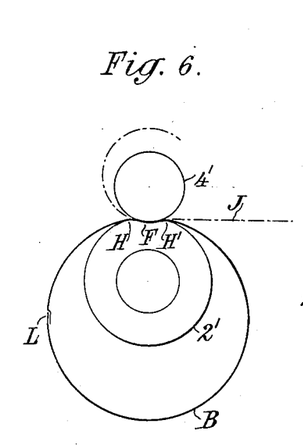
Fig. 6 is a cross-section of a modified roll arrangement wherein but a single pair of rolls is employed, one roll being resiliently deformable and the other being rigid.

As illustrative of an exceedingly simple form that the present invention may take, there is shown in Fig. 6 a single pair of rolls, the internal roll 2′ within the can body B being of the resiliently-deformable character corresponding to the roll 2 in the embodiment first described herein. The external roll 4′ is a simple non-deformable cylinder. With such an arrangement the wave-bending effect according to the present invention is produced when the body is gripped between the rolls with sufficient pressure to cause the non-deformable roll 4′ to penetrate the deformable roll 2′, as shown. As far as I am aware, this method of bending sheet metal is in itself a feature of novelty. Rolls have been hitherto provided with resilient surfaces in various metal rolling devices, but such resilience has been provided merely to avoid marring of the work as it is fed between the rolls. The familiar tinsmiths' bending rolls are sometimes provided with a covering of rubber. This gives a greater tractive effect and avoids marring the material fed therebetween, as stated above, but the resilience thus imparted to the rolls does not in any way contribute to their bending effect. It will be apparent that if the rolls be of equal resilience no bending effect can possibly result inasmuch as such rolls, when brought together, will simply flatten out over their contact areas and one roll will not indent the other in such manner as to produce any bending of the metal engaged therebetween. Where one of the rolls is readily deformable and the other of a relatively non-deformable character in accordance with the present invention, the cooperative effect is to produce a very pronounced bending of the metal. As indicated by the dotted line in Fig. 6, if instead of the tubular body B a flat sheet of metal J were inserted between the rolls it would be curled around the roll 4′, as shown. Such action can only be obtained with the ordinary bending rolls by substituting two lower rolls for the single deformable roll according to the present invention. The said two lower rolls being tangent to the upper roll would cause the metal sheet to be bent therearound, the bending being achieved in a manner analogous to that which occurs between the three rolls 60, 61, 84, of Fig. 7. Thus it will be seen that two rolls arranged in accordance with the present invention perform the same operation that ordinarily requires three rolls. There are sheet bending machines of the so-called "two roll type" now in general use, but in these the essential function of the third bending roll is performed by a stationary deflector element. With the resilient roll arrangement according to the present invention, not only is the bending action achieved directly by the interengagement of the two cooperating rolls, but the degree of curvature imparted to the metal may be controlled by simply varying the pressure applied to the rolls.

When a can body is operated upon by the single pair of rolls, as shown in Fig. 6, the body will inevitably enforce a return bending of the tubular wall at the points H, H′ on either side of the bend F. That is to say, the body which is bent concavely by the indenting effect of the external roll at the point F will be restored to a convex curvature as soon as the material passes beyond the rolls, by virtue of the fact that the general tubular form of the body forces the wall to travel in an orbit about the internal roll. Thus even with a single pair of rolls the tubular body wall is subjected to both inward and outward wave-bending. While this arrangement is not as rapidly effective as that shown in Fig. 1, it does have a pronounced smoothing action upon the body wall by which the local irregularities therein may be greatly reduced in a single revolution of the body, and if the final truing operation as described in connection with Fig. 2 is not required, the single external roll affords a satisfactory though less efficient substitute for the double external roll arrangement.

As employed in the manufacture of can bodies the present invention contemplates the initial forming of the body tube in any known manner. The side seam may be of the conventional lock seam type, as shown at K in Fig. 1, or it may be of the lap seam type, shown at L in Fig. 6. The forming and seaming of the can body tube may be performed by hand or by automatic machinery. Various body-forming machines are well known in the art and need not here be described. Reference may be had to the Kruse Patent No. 1,046,088, dated December 3, 1912, for a disclosure of the Lap-seam body-forming mechanism, and to Kruse Patent No. 1,723,737, dated August 6, 1929, for Lock-seam body-forming mechanism. After the body has been formed it is subjected to the smoothing action of the wave-bending rolls according to the present invention and thereby freed from the local irregularities which are ordinarily developed in the course of bending and seaming the body into tubular form. Thereafter, as a final step, the body may be trued up or brought to a form closely approximating a perfectly circular cylinder by the truing method hereinbefore set forth. It will be understood that the latter step is optional since a body which has been subjected to the initial smoothing process will be freed from all major irregularities in contour.

As hereinbefore set forth, various methods have been employed in an effort to obtain more smoothly rounded can bodies by treating the body blanks before they have been formed into seamed tubes, but as far as I am aware, the novel process herein disclosed of smoothing the body after it is in the form of a completed tube permits of obtaining smoother and more perfectly rounded can bodies than have hitherto been produced. Such improved results are had regardless of the character of the mechanism which initially forms the body tube.

While the preferred method and apparatus for treating can bodies in accordance with the present invention have been hereinbefore described, together with various modifications, it will be understood that the invention is not limited thereto but may be otherwise variously modified and embodied without departing from the spirit of the invention as set forth in the following claims.

With reference to the use of the term "can bodies" in this description, it is to be understood that such bodies are essentially sheet metal tubes, and since the invention is applicable to the rounding and truing of other such tubes or similar sheet metal articles, it is to be understood that any forms of tubular sheet metal articles are included in the term "can bodies" as herein used.

What I claim is:

1. The method of treating a sheet metal tubular body, consisting in subjecting it to wave-bending progressing circumferentially around the body, such bending being sufficient to stress the metal beyond its elastic limit.

2. The method of treating tubular can bodies, consisting in subjecting the wall thereof to wave-rolling, such rolling acting to bend the wall material beyond its elastic limit and progressing circumferentially with respect to the tubular body until substantially the entire wall area has been acted upon.

3. The method of smoothly rounding a tubular can body, consisting in subjecting the wall of said body to circumferentially progressive wave-bending, such bending stressing the normally convex wall inwardly to a sufficient degree to render said wall locally concave during the passage of the bending wave.

4. The method of smoothly rounding a tubular can body, consisting in subjecting the wall of said body to circumferentially progressive wave-bending, such bending stressing the wall both outwardly and inwardly beyond its elastic limit.

5. The method of smoothly rounding a tubular can body, consisting in simultaneously subjecting the wall of said body to a plurality of circumferentially progressive wave-bendings.

6. The method of smoothly rounding a tubular can body, consisting in simultaneously subjecting the wall of said body to circumferentially progressive concave and convex wave-bendings, the elastic limit of the wall material being exceeded by both said concave and said convex bendings.

7. The method of smoothly rounding and truing a tubular can body, consisting in subjecting the wall thereof to a plurality of circumferentially progressive wave-bendings, the normally convex body wall being rendered concave during one of said bendings, whereby to reduce the local irregularities in said wall, a subsequent opposite bending restoring the said body wall to a substantially uniform convex curvature whereby to true said body to the required cylindrical form.

8. The method of producing smoothly rounded can bodies, formed from a sheet of metal body blank with its edges united to form a seamed tube, consisting in subjecting the wall of said tube to circumferentially progressive wave-bending whereby to work the wall into a more uniformly rounded contour.

9. The method of producing smoothly rounded can bodies, consisting in seaming the side edges of a body blank together to form a tube and thereafter subjecting the wall of said tube to a circumferentially progressive wave-bending action, such action during at least one bending phase, rendering concave the normally convex body wall.

10. The method of producing smoothly rounded and substantially true circular can bodies, consisting in seaming the side edges of a body blank together to form a tube and thereafter subjecting the wall of said tube to a circumferentially progressive wave-bending action, which, during at least one bending phase, renders concave the normally convex surface of said tube, the wall thereafter being subjected to a further circumferentially progressive bending action which stresses said wall convexly beyond its elastic limit whereby to set its surface to a substantially uniform curvature throughout.

11. The method of treating a tubular can body, consisting in forcing the wall of said body into wave-indenting engagement with a resiliently deformable surface, and rotating said body wall while thus engaged whereby to produce a circumferentially progressive wave-bending action therein.

12. Apparatus for treating tubular can bodies, comprising cooperating bending elements adapted to engage externally and internally the wall of a tubular can body, said elements being mutually related so as to produce a wave-bending of the wall engaged therebetween, such bending exceeding the elastic limit of the wall material, and means for effecting relative movement between said bending elements and said body whereby the wave-bending effect of said elements progresses circumferentially with respect to the body.

13. Apparatus for treating tubular can bodies, comprising cooperating bending rolls adapted to engage externally and internally the wall of a tubular can body, the said rolls being mutually related so as to locally bend the body wall oppositely to its normally convex curvature, and means for effecting relative movement between said rolls and said body whereby the local bending effect of said rolls is circumferentially progressive with respect to the body.

14. Apparatus for smoothly bending sheet metal, comprising a resiliently deformable member, a relatively unyielding cylindrical roll cooperating therewith, and means adapted to hold said roll and member in such relationship that the sheet metal advancing therebetween will be forced into conformity with the cylindrical contour of said roll by the resilient deformation of the said member.

15. Apparatus for smoothly bending sheet metal, comprising a pair of cooperating bending rolls between which the sheet metal is advanced, one of said rolls being materially more resilient than the other, and means for maintaining sufficient pressure between said rolls to cause the normally convex cylindrical surface of one roll to be rendered locally concave by the indenting action of the other roll.

16. Apparatus for smoothly bending sheet metal, comprising a pair of cooperating bending rolls between which the sheet metal is advanced, one of said rolls being substantially unyielding, the other of said rolls being resiliently deformable and positioned relative to said substantially unyielding roll so as to be concavely deformed thereby, the sheet advancing between said rolls being pressed into conformity with the contour of the substantially unyielding roll on the resilient deformation of the other of said rolls.

17. Apparatus for smoothly rounding a tubular can body, comprising cooperating bending rolls adapted to engage externally and internally the wall of said body, the said rolls being of different hardness, means for pressing said rolls together with sufficient force to cause the body wall which is rolled therebtween to receive a wave-bend due to the indentation of the softer of said rolls by the harder roll.

18. Apparatus for smoothly rounding a tubular can body, comprising coperating bending rolls adapted to engage externally and internally the wall of said body, the internal roll being resiliently deformable and of larger diameter than the external roll, roll driving means, and means for pressing said rolls together, whereby the normally convex body wall will be bent concavely within the area progressively engaged by said rolls.

19. Apparatus for smoothly rounding a tubular can body, comprising a single resiliently deformable bending roll internally engaging the wall of said body, a plurality of relatively non-deformable bending rolls externally engaging said wall, means for driving said internal roll, and means for holding the internal and external rolls in such relative position that the external rolls effect a plurality of substantially parallel wave-like deformations in the cooperating surface of said internal roll.

20. Apparatus for smoothly rounding a tubular can body, comprising a plurality of cooperating bending rolls, said rolls in one relationship being adapted to enforce both concave and convex wave-bends in the wall of said body, and means adapted to shift the relative position of said rolls so as to establish an operative relationship in which the rolls enforce only an increase in the normal convex curvature of the body wall.

21. Apparatus for smoothly rounding a tubular can body, comprising a resiliently deformable internal roll, a plurality of external rolls cooperating therewith, roll driving means, and roll-shifting means for varying the radial distance between the axes of the external rolls and the axis of said internal roll.

22. Apparatus according to claim 21, further characterized in that adjustable means are provided to regulate the maximum indenting effect of the said external rolls upon the said deformable internal roll.

23. Apparatus for smoothly rounding a tubular can body, comprising a resiliently deformable internal roll, a power drive for said roll, a pair of freely rotatable external rolls cooperating with said internal roll, a reciprocatable carrier for said external rolls, and means for shifting said carried toward and away from said internal roll.

24. Apparatus for smoothly rounding a tubular can body, comprising cooperating bending rolls adapted to engage externally and internally the wall of said body, a bearing at each end of said internal roll, means adapted to effect relative displacement between one of said bearings and said roll whereby to permit the tubular body to be received by the free end of the roll when the said bearing is separated therefrom, said bearing affording a rigid support for the end of said roll when engaged therewith, and means for changing the distance between the said internal and external rolls whereby they may be brought into operative engagement with the body wall and subsequently released to permit the free removal of said body.

25. Apparatus for smoothly rounding a tubular can body, comprising cooperating bending rolls adapted to engage externally and internally the wall of said body, and to subject it to wave-bending by its rolling between them, and end guides adapted to guide said body as the latter revolves between said rolls.

26. Apparatus according to claim 25, further characterized in that at least one of said end guides is axially adjustable relative to the said rolls.

27. Apparatus according to claim 25, further characterized in that means are provided to move one of said guides from an operative to an inoperative position whereby to permit free axial movement of the body relative to said rolls.

28. Apparatus for smoothly rounding a badly deformed tubular can body, comprising cooperating bending rolls adapted to engage externally and internally the wall of said body, body expanding means associated therewith, said means being adapted to preliminarily shape the deformed body sufficiently to permit the latter to be received between said rolls, and means adapted to press said internal and external rolls into operative engagement with said body whereby as the latter revolves the body wall is progressively set to a uniform curvature.

29. Apparatus according to claim 28, further characterized in that a single internal roll is provided, the said body expanding means comprising a tapered element at one end of said roll, said element being adapted to wedge open the deformed body tube so that the latter may be freely positioned upon said internal roll.

30. The method of treating a sheet metal tubular body, consisting in subjecting it to wave-bending by rolling it circumferentially with sufficient deflection to stress the metal beyond its elastic limit.

31. The method of treating a sheet metal tubular body, consisting in subjecting it to circumferentially progressing wave-bending sufficient to stress the metal beyond its elastic limit, followed by a circumferential rolling of the body to remove any residual waves and reduce the body to a smoothly rounded contour.

FRANK KRUEGER.